United States Patent
Jones

(10) Patent No.: US 10,155,159 B2
(45) Date of Patent: Dec. 18, 2018

(54) TACTILE FEEDBACK SYSTEMS AND METHODS FOR AUGMENTED REALITY AND VIRTUAL REALITY SYSTEMS

(71) Applicant: Activision Publishing, Inc., Santa Monica, CA (US)

(72) Inventor: Allan Jones, Valencia, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 98 days.

(21) Appl. No.: 15/240,999

(22) Filed: Aug. 18, 2016

(65) Prior Publication Data

US 2018/0050267 A1 Feb. 22, 2018

(51) Int. Cl.
| | | |
|---|---|---|
| *G08B 6/00* | (2006.01) | |
| *A63F 13/00* | (2014.01) | |
| *A63F 13/285* | (2014.01) | |
| *A63F 13/327* | (2014.01) | |

(52) U.S. Cl.
CPC .......... *A63F 13/285* (2014.09); *A63F 13/327* (2014.09); *A63F 13/00* (2013.01); *A63F 2300/8082* (2013.01); *G08B 6/00* (2013.01)

(58) Field of Classification Search
CPC .................................. A63F 13/00; G08B 6/00
See application file for complete search history.

(56) References Cited

U.S. PATENT DOCUMENTS

| | | | |
|---|---|---|---|
| 2014/0285329 A1* | 9/2014 | Lee .......................... | G08B 6/00 340/407.1 |
| 2016/0292924 A1* | 10/2016 | Balachandreswaran ..................... | G06T 19/006 |
| 2017/0337736 A1* | 11/2017 | Cheng .................. | G02B 27/017 |

* cited by examiner

*Primary Examiner* — James S McClellan
*Assistant Examiner* — Syvila Weatherford
(74) *Attorney, Agent, or Firm* — Vista IP Law Group LLP

(57) ABSTRACT

A tactile feedback system for use with a virtual reality system comprises a support structure and tactile feedback units coupled to and spaced apart around the support structure. A microcontroller is coupled to the tactile feedback units to independently control their activation. The microcontroller has a communication interface configured to communicate with the virtual reality system to receive control signals for controlling operation of the tactile feedback units. The microcontroller activates the tactile feedback units in response to control signals received from the virtual reality system to indicate aspects of the virtual reality experience. In another aspect, a haptic gun for use with a virtual reality system has tactile feedback units and a linear actuator for simulating a recoil of firing the gun. In another aspect a video game system provides a single game play instance for multiple clients utilizing different game platforms.

8 Claims, 13 Drawing Sheets

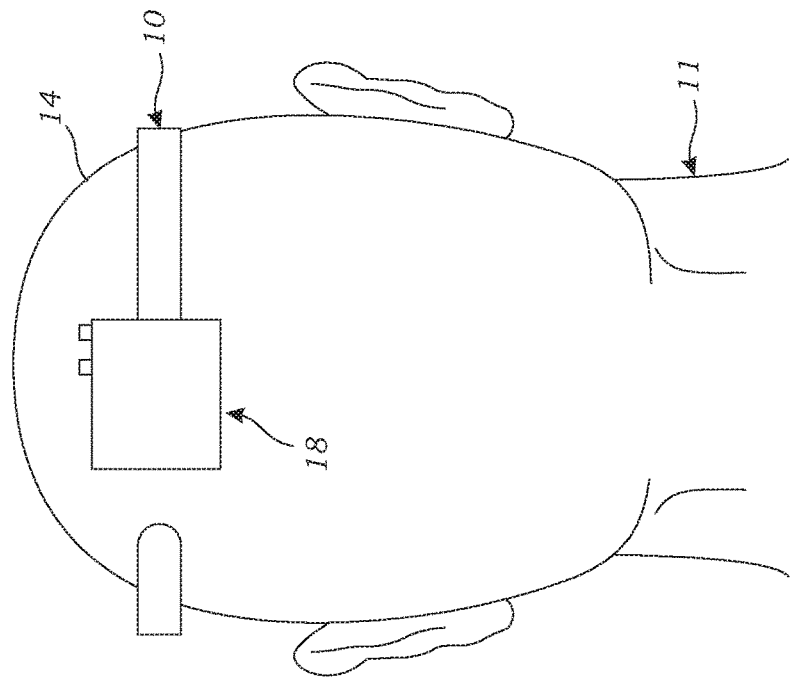
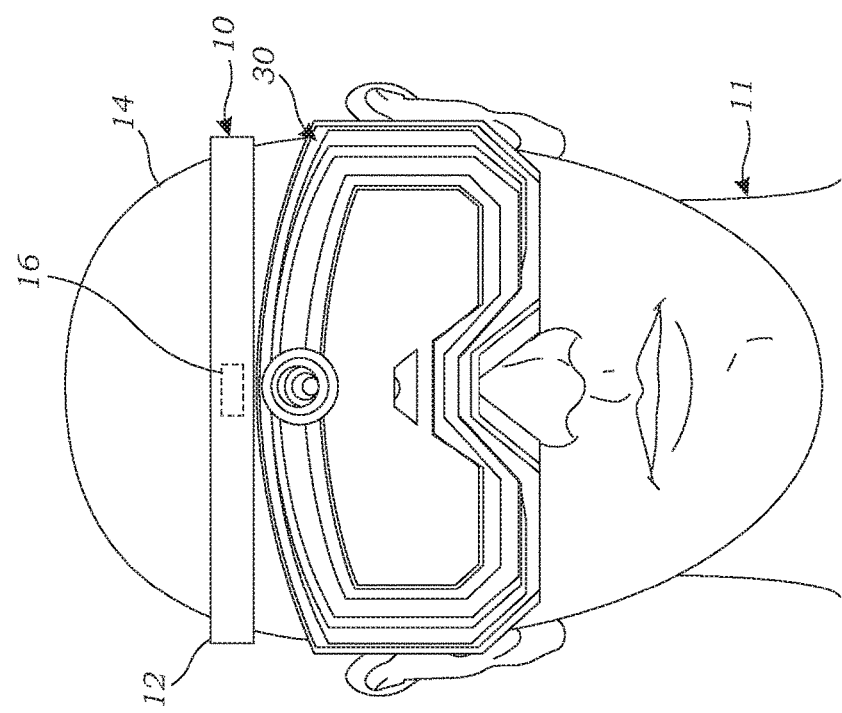

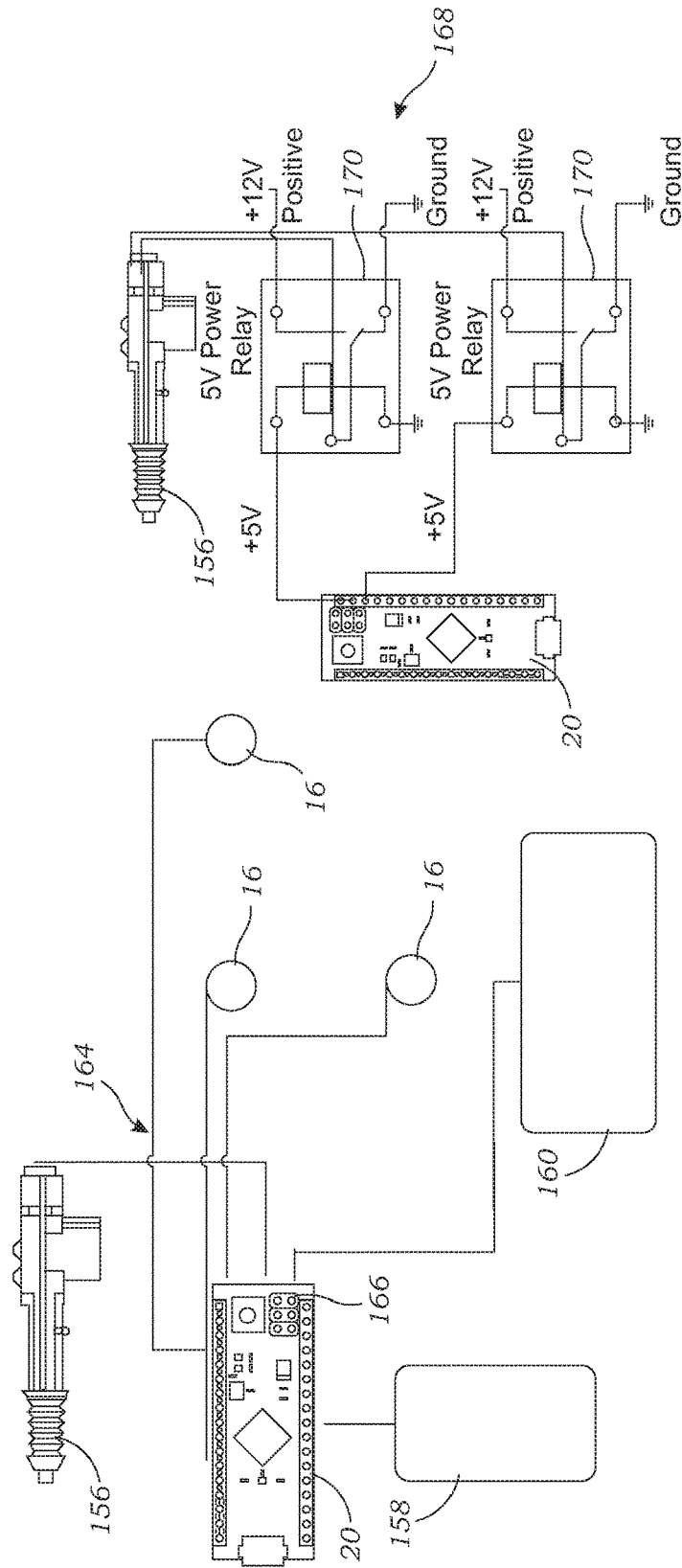

TACTILE FEEDBACK SYSTEMS AND METHODS FOR AUGMENTED REALITY AND VIRTUAL REALITY SYSTEMS

FIELD OF THE INVENTION

The present invention relates generally to augmented reality and virtual reality systems, and more particularly, to tactile feedback systems and methods for augmented and virtual reality systems.

BACKGROUND OF THE INVENTION

Virtual reality is a computer technology that replicates an environment, which may be a simulation of a real life environment or an imaginary environment, and simulates a user's presence in the environment allowing the user to interact with the environment. Current forms of virtual reality are displayed on a computer display or with a special virtual reality headset worn over the user's eyes, which provides visual and sound simulations of the virtual reality experience. Some simulations also include additional sensory input, such as haptic/tactile feedback to the user to simulate various interactions with the virtual reality. The user may interact with the virtual reality using standard computer input devices such as a keyboard and mouse, and also through multimodal devices such as gloves or other wearables having sensors to detect motion and forces, and/or external motion sensors which detect a user's position and motions.

Augmented reality is similar to virtual reality in that it involves a computerized simulation, but differs in that augmented reality utilizes a real-world environment in which certain elements are augmented and/or supplemented by a computer-generated simulation of sensory input such as video, sound, graphics, and/or tactile feedback. The computer-generated simulation may be overlaid onto a computer reproduction of the real-world environment.

For purpose of the present description, the term "virtual reality" shall mean either, or both, virtual reality and augmented reality, as their differences do not affect the present invention.

In order to enhance the virtual reality experience, tactile feedback devices, also referred to as haptic devices, have been employed with virtual reality systems. Tactile feedback devices apply forces, vibrations or motions to a user in order to provide tactile sensory input in virtual reality to a user, such as to simulate the sense of touch or to provide other feedback of experiences within the virtual reality, such as crashing, being shot, loading or shooting a gun, or colliding with something.

SUMMARY

In one aspect, the present invention is directed to an innovative tactile feedback system for use with a virtual reality headset which utilizes a plurality of tactile feedback devices to enhance the immersion into the virtual reality experience and provide entertaining and useful tactile sensory perception to a user within the virtual reality.

Accordingly, in one embodiment, a multi-directional, tactile feedback system for use with a virtual reality headset being used to present a virtual reality experience is provided. The tactile feedback system has a support structure, a plurality of tactile feedback units mounted to the support structure in spaced apart relation, and a microcontroller coupled to the support structure. The support structure may be the housing and/or other structure of the headset or a separate wearable device such as a headband, helmet, cap, other head mounting structure, etc. Each of the tactile feedback units is operably coupled to the microcontroller and is configured to produce a tactile feedback to a user, and includes a transducer which can apply forces, vibrations or motions to the user thereby providing tactile sensory input to the user. For instance, the tactile feedback units may be positioned in an angularly spaced array or other pattern around the user's body, such as around the user's head. The microcontroller is configured to utilize control signals generated during the operation of the headset to control the operation of the tactile feedback units. For example, while the headset is presenting a virtual reality experience, such as playing a game or showing a video, the game or video may generate control signals which the microcontroller utilizes to control the operation of the tactile feedback units. In one aspect, the tactile feedback system may be integrated into the headset such that the microcontroller is integrated into the headset, in which case the microcontroller may be integrated with the electronics of the headset or a separate electronic system operably coupled to the headset.

In another aspect, the microcontroller may be a separate system having a communication interface configured to electronically communicate with the headset, for instance a wireless communication interface, such as Bluetooth, Wi-Fi, HaLow or other future wireless standards, or a wired communication interface, such as USB. In this case, the microcontroller receives the control signals from the headset via the communication interface.

In another aspect, the microcontroller is configured to operate the tactile feedback units in response to the control signals to indicate a directional aspect of the virtual reality experience. For example, the microcontroller may activate a specific tactile feedback unit that is angularly located to correspond to the angular location of an event occurring in the virtual reality experience, such as the location of a hit (e.g., hit by a shot from a weapon, or punched by another player) on the user's persona within the virtual reality experience. If the user is shot on the right side, the microcontroller may activate a tactile feedback unit located on the right side of the angularly spaced array. The control signals may include directional data related to the directional aspect of the virtual reality experience being signaled using the tactile feedback system.

In additional aspects, the tactile feedback system may be configured to provide a number of use cases. In one use case, the tactile feedback system may be configured to provide a threat detection warning signal to the user to indicate that the user is being threatened within the virtual reality experience. This is similar to a "sixth sense" or "Spidy Sense." The threat detection warning signal can be a general threat detection warning signal, or a specific threat detection warning signal such as a directional threat detection warning signal by using the directional aspect described above. Other specific threat detection warning signals include a severity threat detection warning signal to indicate a severity aspect of the virtual reality experience, and an imminence/urgency threat detection warning signal to indicate an urgency aspect of the virtual reality experience. For example, the microcontroller may activate the tactile feedback system with a level of force corresponding to a severity level occurring in the virtual reality experience (e.g., a fender bender versus a head-on crash). Similarly, the microcontroller may activate the tactile feedback system in a pattern or other manner corresponding to a degree of urgency occurring in the virtual reality experience. An example of this may be if an enemy is approaching from far away, the tactile feedback units may vibrate slowly or be activated in a slow-rotating pattern, and as the enemy approaches closer the vibrations and/or speed of the pattern activation increases.

In another use case, the tactile feedback system may be configured to indicate that a user has been killed in a game, eliminated from a game, or that the user's game has otherwise ended. For instance, the microcontroller may be configured to activate all of the tactile feedback units at the same time and/or in a certain manner in response to a control signal corresponding to such an event.

In still another use case, the tactile feedback system may be configured to signal to a user the direction and/or intensity of damage to the user within the virtual reality experience. The microcontroller may be configured to activate particular tactile feedback unit(s) in the array related to the direction of damage and/or to adjust the intensity of the activation of such tactile feedback units based on the control signals.

The tactile feedback system may also be configured to signal to the user other aspects of a virtual reality experience, such as vibration thrusters, various other warnings such as low ammunition, weapon re-loading, weapon upgrading, etc.

Another embodiment of the present invention is directed to methods of providing tactile feedback with a virtual reality system being used to present a virtual reality experience. For example, the methods may include the methods of using the tactile feedback system described herein, including the additional aspects, features and use cases.

Still another embodiment of the present invention is directed to a haptic, toy gun game controller for use with a virtual reality headset for presenting a virtual reality experience, such as playing a virtual reality game. The haptic gun may be shaped and configured as any type of gun, such as a handgun, rifle, shotgun, machine gun, laser gun, BB gun, paintball gun, pellet gun, light machine gun ("LMG"), etc. The haptic gun includes a main body having a handle. The body may be in the shape of the type of gun. A microcontroller having a processor is housed in the main body. A first communication interface is also housed in the main body. The first communication interface is operably coupled to the microcontroller and is configured to electronically communicate with the headset. The first communication interface may be any suitable communication interface, including those described herein. The haptic gun has a trigger coupled to the main body, and operably coupled to the microcontroller. A plurality of tactile feedback units are coupled to the main body and are spaced apart around the body. Each of the tactile feedback units is operably coupled to the microcontroller. The tactile feedback units are configured to produce a haptic feedback to a user, such as the tactile feedback units described above.

A linear actuator is coupled to the main body and operably coupled to the microcontroller. The linear actuator is configured to provide a linear force simulating a recoil from firing the haptic gun. The haptic gun also has a tracker device housed within the main body. The tracker device is configured to provide tracking data to the virtual reality system (e.g., a virtual reality headset). For example, the tracker device may include accelerometer(s), and/or other sensors to detect the motion and orientation of the haptic gun. The tracker device may have a tracker device communication interface, such as a wireless interface or wired interface for communicating with the headset. In other aspects, the tracker device may be integrated with the microcontroller and/or the first communication interface.

The microcontroller of the haptic gun is configured to electronically communicate with the headset via the communication interface to receive control signals from the headset for controlling operation of the tactile feedback units and the linear actuator. The microcontroller operates the tactile feedback units and the linear actuator based on the control signals. The microcontroller also sends a trigger signal to the headset in response to actuation of the trigger by the user.

As an example of the operation of the haptic handgun, the user is utilizing the haptic handgun with a virtual reality headset and is playing a virtual reality game. Within the virtual reality game, the user sees a target (e.g., an enemy) to shoot at. The user moves and aims the haptic gun. The tracker device senses the motion and aim point of the gun and provides tracking data to the microcontroller and sends the tracking data to the headset via the tracker device communication interface. The virtual reality headset may be configured to utilize the tracking data to control the image of a gun within the virtual reality game which corresponds to the haptic gun. For instance, as the user moves and aims the haptic gun, the virtual reality headset may move and aim the gun in the virtual reality game accordingly. When the user actuates the trigger, the microcontroller detects that the trigger has been actuated and sends a trigger signal to the headset. The headset then sends control signals to the microcontroller which the microcontroller uses to control the operation of the tactile feedback units and the linear actuator.

In additional aspects, the haptic gun may also be configured to provide various use cases for controlling the tactile feedback units and the linear actuator based on the control signals received from the headset. In one use case, the microcontroller may receive a control signal from the headset indicating whether to fire in response to sending a trigger signal to the headset. The headset receives the trigger signal and determines whether the corresponding gun in the virtual reality game can be fired (e.g., is there ammunition?; is the gun damaged or otherwise prevented from firing?). If the headset determines the gun can be fired, the headset sends a "fire gun" control signal to the microcontroller. In response to receiving the fire gun control signal, the microcontroller is configured to activate the linear actuator to simulate a recoil from firing the gun. If the headset determines the gun cannot be fired when receiving the trigger signal, the headset can send a "do not fire" control signal, or no control signal at all. In response to receiving a do not fire control signal, the microcontroller may be configured not to activate the linear actuator, and/or to activate one or more of the tactile feedback units to simulate a hammer or other component of the gun actuating when the gun fails to fire upon pulling the trigger.

In additional use cases, the headset may be configure to send a weapon upgrade control signal, a weapon damage control signal, or other control signals. The microcontroller is configured to respond to such signals by activating the linear actuator and/or tactile feedback units in a certain manner.

Still another embodiment of the present invention is directed to a video game system for providing a single game play instance in which multiple clients can play, each client utilizing a different game platform. The video game system includes a first game platform executing a virtual reality game on a virtual reality system. The virtual reality system may be a virtual reality headset, as described herein, or other virtual reality system. The video game system includes a second game platform executing a game having a similar representation of the virtual reality game but modified for the second game platform. In addition, the first game platform and second game platform are configured to communicate with each other to provide a single instance game space for the first game platform and second game platform.

In another aspect of the video game system, the first game platform and second game platform may be configured to communicate over a communication network comprising the Internet. In still another aspect, the first game platform may be linked to a third game platform which displays a representation of the virtual reality game on a video display as the game is being played on the first game platform.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant:

FIG. 3 is front view of the tactile feedback system of FIG. 1, as worn on the head of a user;

FIG. 4 is a rear view of tactile feedback system of FIG. 1, as worn on the head of a user;

FIG. 17 is a high-level schematic view of the electronic system for the haptic gun of FIG. 15, according to another embodiment of the present invention;

FIG. 18 is a schematic view of the electronic system for the linear actuator of the haptic gun of FIG. 15, according to another embodiment of the present invention;

DETAILED DESCRIPTION

Referring to FIGS. 1-6, one embodiment of a multi-directional, tactile feedback system 10 for use with a virtual reality system 30 (see FIG. 6, in which the virtual reality system 30 is a virtual reality headset 30) configured to present a virtual reality experience to a user is illustrated. The virtual reality system 30 may be any suitable system for presenting a virtual reality experience, such as a virtual reality headset, goggles, helmet, video display(s), etc. In general, the virtual reality system 30 includes a processor (e.g., a microprocessor), a software program configured to program the virtual reality system to present the virtual reality experience, a display device (e.g., video display(s)), and a system communication interface. The virtual reality experience can be any type of entertainment or informational program, such as a video game, a movie, a video, etc. As explained above, the term "virtual reality" as used herein includes either, or both, virtual reality and augmented reality. The system communication interface may be any suitable communication interface for communicating with the tactile feedback system 10 and/or other electronic systems. For instance, the interface can be a wireless communication interface, such as Bluetooth or Wi-Fi, or a wired communication interface, such as USB.

Figure 1:
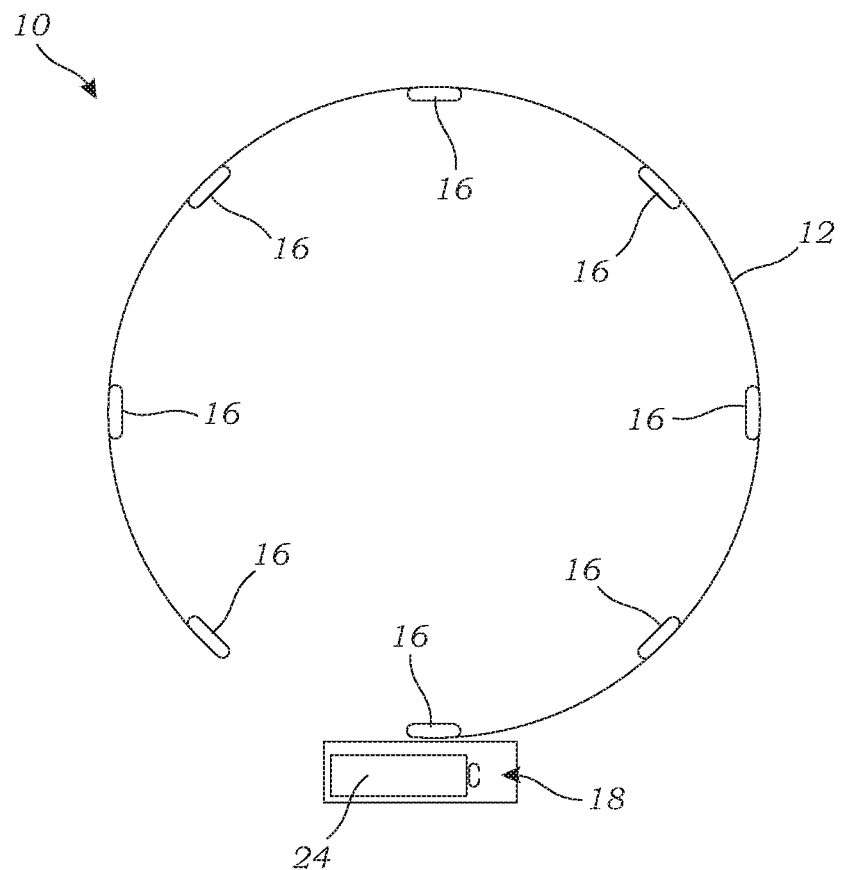
FIG. 1 is a top view of a multi-directional, tactile feedback system for use with a virtual reality system, according to one embodiment of the present invention.
Figure 2:
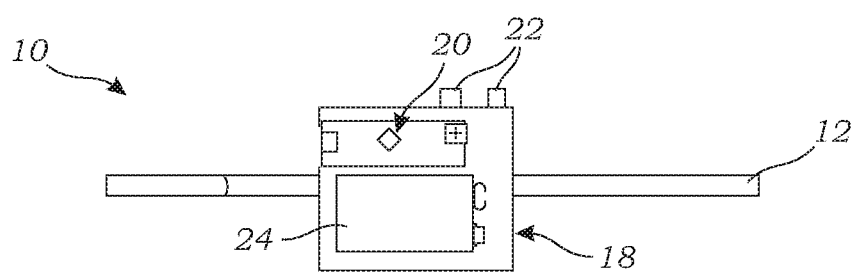
FIG. 2 is a rear view of the tactile feedback system of FIG. 1.
Figure 6:
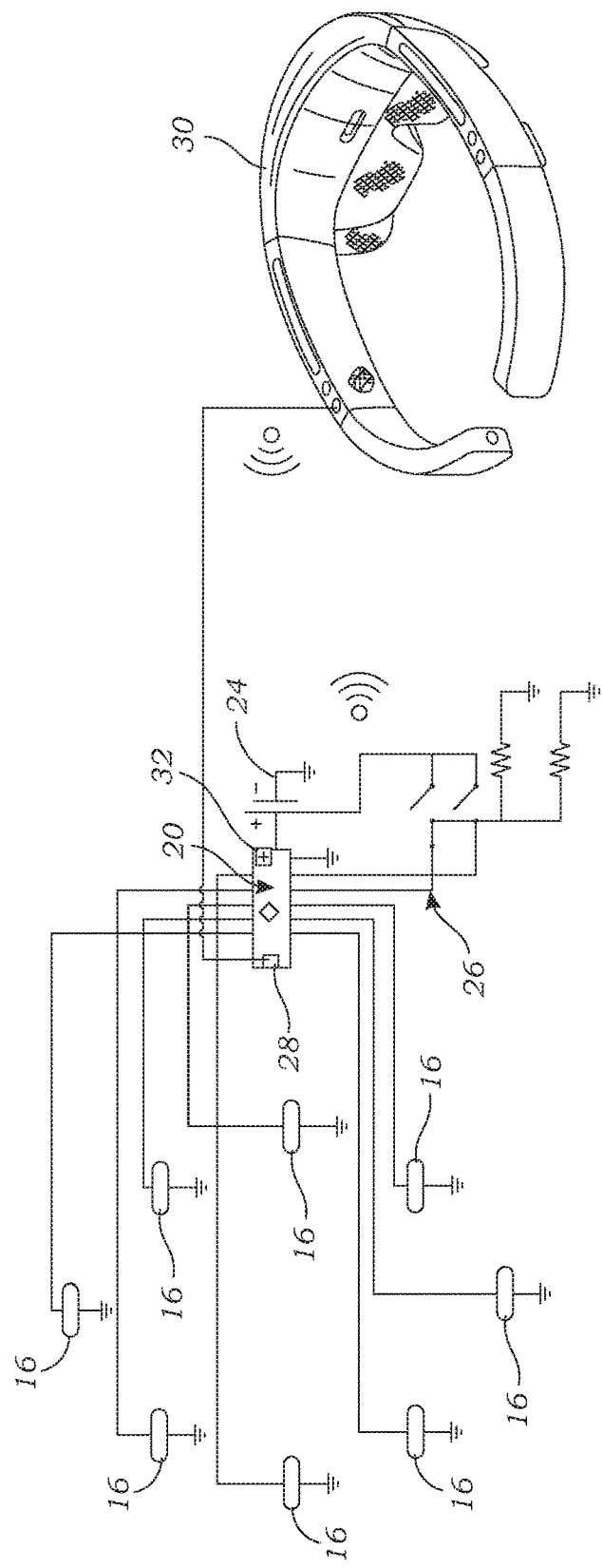
FIG. 6 is a schematic view of the tactile feedback system of FIG. 1 in combination with a virtual reality headset for presenting a virtual reality experience.

Turning to FIGS. 1 and 2, the tactile feedback system 10 includes a support structure 12, which in this case is a headband 12 configured to be worn on the head 14 of a user 11 (see FIGS. 3 and 4). As explained herein, the support structure 12 may be integrated with a virtual reality system 30 (e.g., integrated with a virtual reality headset), or it may be a separate wearable device such as the headband 12, or other wearable device such as a hat, helmet, goggles, glasses, etc. In this described embodiment, the tactile feedback system 10 is a separate wearable device which communicates with a virtual reality system 30, such as the virtual reality headset 30 as shown in FIG. 6. A plurality of tactile feedback units 16 are mounted to the headband 12 angularly spaced apart around the headband 12. Each of the tactile feedback units 16 is a tactile feedback device which can apply forces, vibrations, or motions which provide tactile sensory input to the user 11. For example, the tactile feedback units 16 may comprise a vibration motor for applying a vibration feedback to the user 11, such as a 10 mm-3-4.5 volt vibration motor. Each of the tactile feedback units 16 is operably coupled to a microcontroller 20 (described below) such that each tactile feedback unit 16 can be operated independently of the other tactile feedback units 16. In this described embodiment, the feedback system 10 has eight tactile feedback units 16 which are angularly spaced at about 45 degrees from each other. More or less tactile feedback units 16 may utilized, and may be spaced about equal angles around the headband, or they may be spaced unequally, or even spaced in multiple groups. For instance, the feedback system 10 may have from 1 to 30, or more, tactile feedback units 16, such as four units 16 (e.g., spaced at about 90 degrees), 5 units 16 (e.g., spaced at about 72 degrees), 6 units 16 (e.g., spaced at about 60 degrees), 10 units (e.g., spaced at about 36 degrees), etc.

Figure 5:
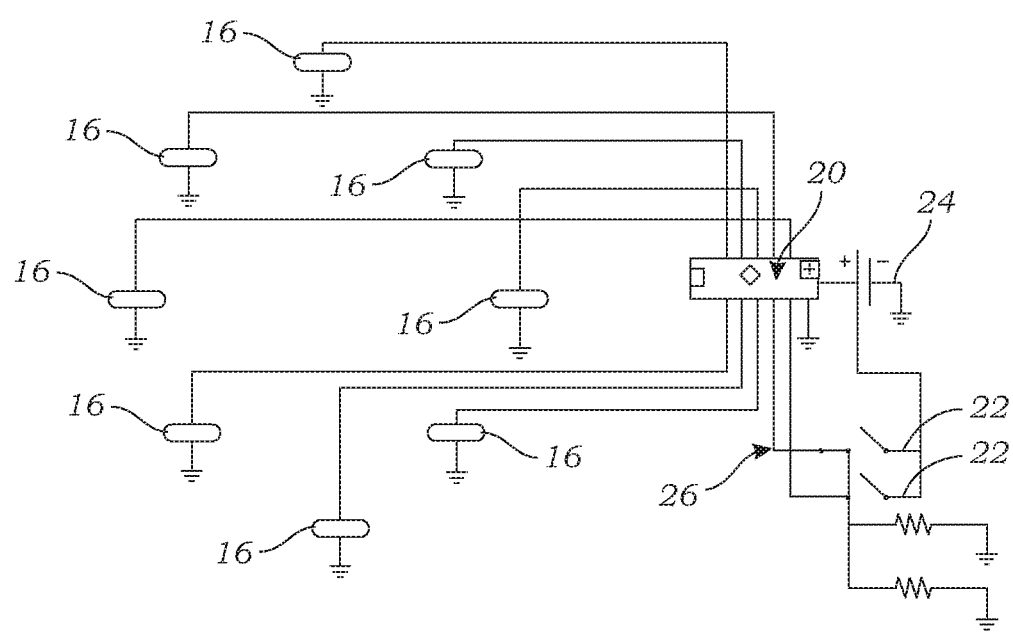
FIG. 5 is a schematic view of the tactile feedback system of FIG. 1.

A control module 18 housing the microcontroller 20 having a processor, user input controls 22, and a power supply 24 (which may include a battery or other power source) is also mounted to the headband 12. Turning to FIGS. 5 and 6, the control module 18 includes an electronic circuit 26, such as a printed circuit board or integrated circuit, operably connecting the microcontroller 20, the power supply 24, and the user input controls 22. The control module 18 also operably connects each of the tactile feedback units 16 to the microcontroller 20 and the power supply 24 in order to control and power the actuation of the tactile feedback units 16. The control module 18 also has a USB communication interface 28, which may be integrated into the microcontroller 20, or separate from the microcontroller 20 and operably coupled to the microcontroller 20. The USB communication interface 28 is configured to provide electronic communication between microcontroller 20 and the virtual reality system 30. The tactile feedback system 10 also has a wireless communication interface 32, which may be integrated into the microcontroller 20, or separate from the microcontroller 20 and operably coupled to the microcontroller 20. The wireless communication interface 32 is configured to provide electronic communication between microcontroller 20 and the virtual reality system 30 and the one or more communication interfaces. In use, the tactile feedback system 10 may be operably connected to the virtual reality system 30 using either, or both, of the USB communication interface 28 and the wireless communication interface 32, to receive control signals from the virtual reality system 30 which the microcontroller 20 uses to control the operation of the tactile feedback units 16.

The user input controls 22 are operably coupled to the microcontroller 20 for adjusting the baseline activation intensity (e.g., vibration intensity) of the tactile feedback system 10. The baseline activation intensity is an intensity of activation from which the different levels of intensity at which the tactile feedback units 16 are activated for various tactile signals to the user, as further described below. The user input controls 22 may comprise a pair of push buttons operably coupled to the microcontroller 20, or any other suitable controls for providing user input to the microcontroller 20 to adjust the baseline activation intensity. The microcontroller 20 is configured to adjust the baseline activation intensity at which the microcontroller 20 activates the tactile feedback units 16 in response to the user input controls 22.

Figure 7:
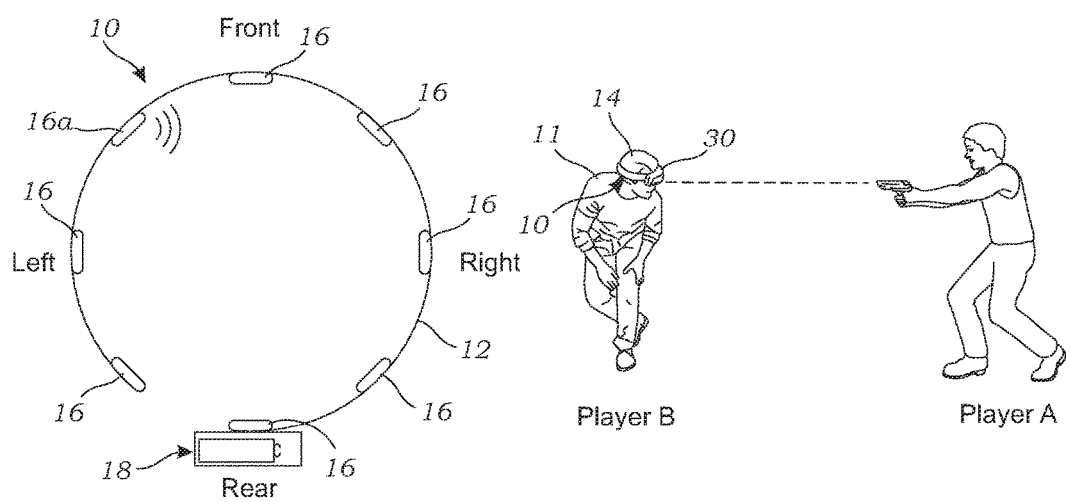
FIG. 7 is a diagram depicting a directional damage scenario being signaled by the tactile feedback system of FIG. 1.
Figure 8:
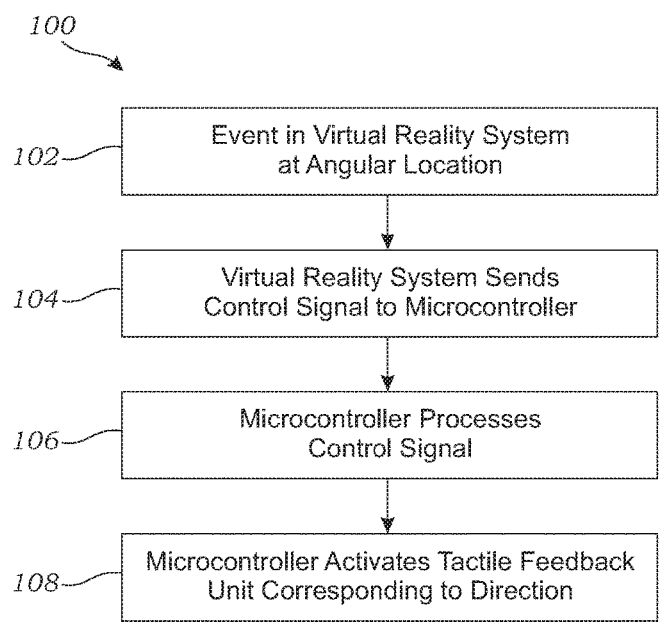
FIG. 8 is a flow chart illustrating a method of operation of the tactile feedback system of FIG. 1 for the directional damage scenario of FIG. 7, according to another embodiment of the present invention.

Turning to FIGS. 7 and 8, a diagram and flowchart depict the tactile feedback system 10 configured to perform a method 100 for signaling a directional damage scenario. As shown in FIG. 7, the tactile feedback system 10 is configured to activate the tactile feedback unit 16a to indicate to the user 11 the approximate direction of damage sustained by the user 11 in the virtual reality experience. For instance, in the example depicted in FIG. 7, the user 11 is damaged (e.g., shot) in the front/left, such that the tactile feedback system 10 activates the tactile feedback unit 16a located on the front/left of the tactile feedback system 10. As shown in the diagram, the user 11 turns to his left in response to the activation of the tactile feedback unit 16a.

Turning to FIG. 8, the method 100 comprises a step 102, in which an event occurs at an angular location relative to the user 11 in the virtual reality experience being executed on the virtual reality system 30. In the example of FIG. 7, the event is the user 11 being shot in the front/left of the user 11. At step 104, the virtual reality system 30 sends a direction control signal to the microcontroller 20 via the USB communication interface 28 or the wireless communication interface 32. The direction control signal indicates the angular direction of the event. For instance, the control signals may be coded and the microcontroller 20 is configured to relate the coded signal to an angular direction. At step 106, the microcontroller 20 processes the direction control signal to determine the tactile feedback unit 16a corresponding to the angular location of the event. For example, the corresponding tactile feedback unit 16 may be the tactile feedback unit which best represents the direction of the event. Then, at step 108, the microcontroller 20 activates the tactile feedback unit 16a based on the direction control signal corresponding to the direction of the event relative to the location of the user 11 in the virtual reality experience.

Figure 9:
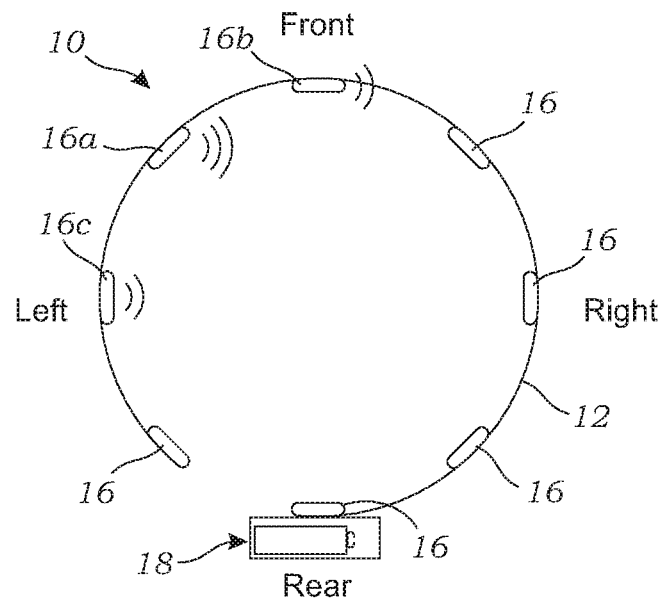
FIG. 9 is a schematic depicting a direction and damage intensity being signaled by the tactile feedback system of FIG. 1.
Figure 10:
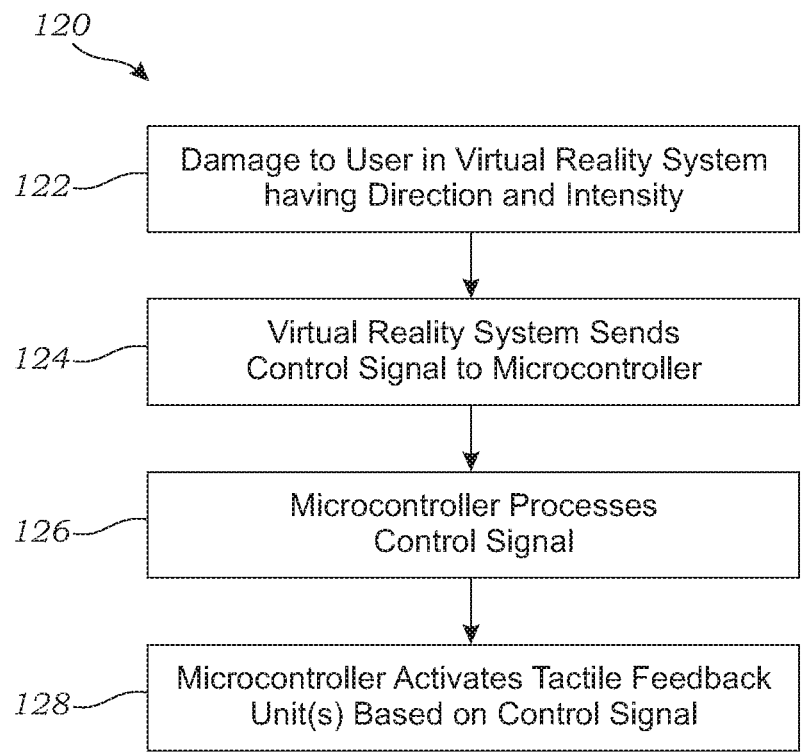
FIG. 10 is a flow chart illustrating a method of operation of the tactile feedback system of FIG. 1 for the direction and damage intensity scenario of FIG. 9, according to another embodiment of the present invention.

FIGS. 9 and 10 illustrate another use case for the tactile feedback system 10 performing a method 120 to signal to the user the direction of damage and damage intensity incurred by the user 11 in the virtual reality experience. The angular location of the damage is basically the same as described above for the method 100. However, as shown in FIG. 9, instead of activating just the one tactile feedback unit 16a, the microcontroller 20 also activates one or more adjacent tactile feedback units 16b and 16c at a lower intensity than it activates the main tactile feedback unit 16a. The number of adjacent tactile feedback units 16 and the intensity of the activation of the adjacent tactile feedback units 16 depend on the level of intensity of the damage. For instance, for minimal damage, perhaps no adjacent tactile feedback units 16 are activated. Above a first threshold and below a second threshold, perhaps only the two adjacent tactile feedback units 16b and 16c are activated at a very low intensity. As the level of intensity increases from the first threshold to the second threshold, the intensity of the two adjacent tactile feedback units 16b and 16c may be increased, but still lower than the intensity of the main tactile feedback unit 16a in order to still effectively signal the direction of the damage. When the second threshold is reached, three or four adjacent tactile feedback units 16 may be activated, with increasing intensity based on an increase in the intensity of damage, and so on as the intensity of the damage increases.

Accordingly, turning to the flow chart of FIG. 10, the method 120 comprises step 122, in which damage occurs to the user 11 in the virtual reality experience being executed on the virtual reality system 30. The damage has an associated direction of damage and intensity of damage. At step 124, the virtual reality system 30 sends a damage direction and damage intensity control signal (this may be a single signal or a separate signal for damage direction and damage intensity) to the microcontroller 20 via the USB communication interface 28 or the wireless communication interface 32, indicating the direction of the damage and the intensity of the damage. At step 126, the microcontroller 20 processes the damage direction and damage intensity control signal(s) to determine the main tactile feedback unit 16a corresponding to the angular location of the event and the adjacent tactile feedback unit(s) 16b and 16c to be activated and their respective intensity. Then, at step 108, the microcontroller 20 activates the tactile feedback units 16a, 16b and 16c based on the control signal to indicate the direction and intensity of the damage occurring in the virtual reality experience.

Figure 11:
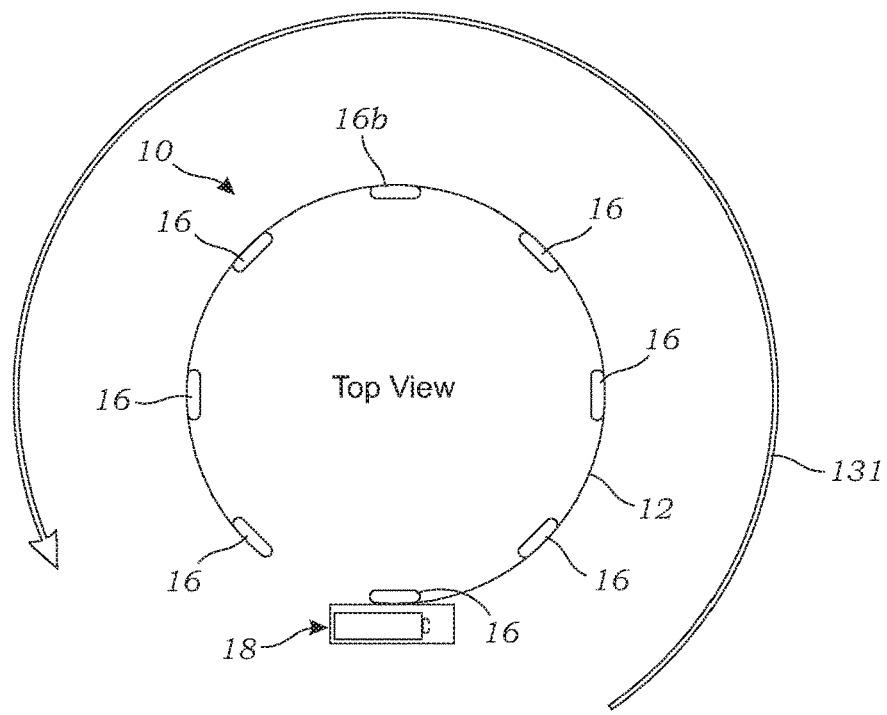
FIG. 11 is a schematic depicting a general threat detection warning scenario being signaled by the tactile feedback system of FIG. 1.
Figure 12:
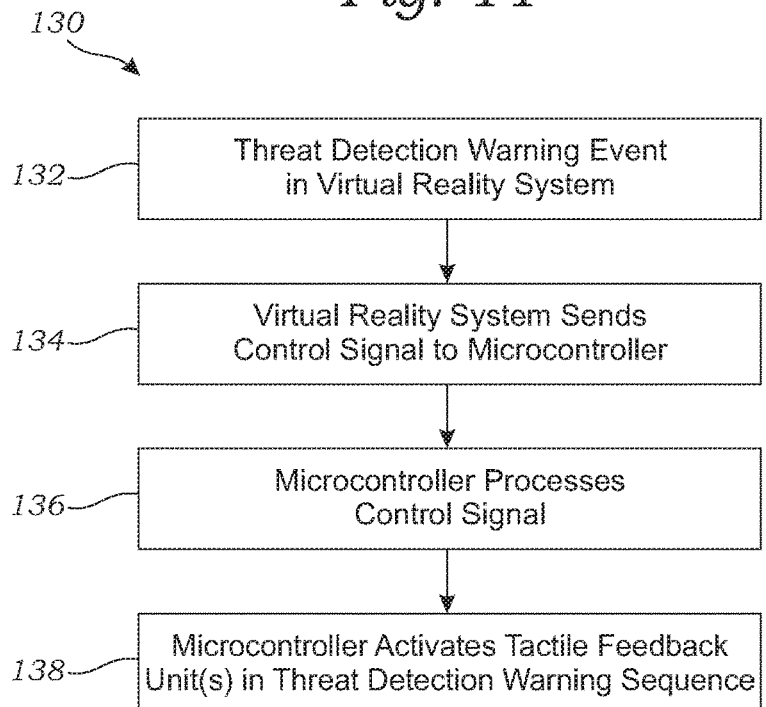
FIG. 12 is a flow chart illustrating a method of operation of the tactile feedback system of FIG. 1 for the general threat detection warning scenario of FIG. 11, according to another embodiment of the present invention.

Turning to FIGS. 11 and 12, a diagram and flowchart depict the tactile feedback system 10 configured to perform a method 130 for signaling a general threat detection warning. A general threat detection warning means it is non-directional, i.e., it does not indicate to the user a direction of a threat (e.g., potential danger) to the user occurring in the virtual reality experience. A general threat detection warning also does not necessarily indicate other specific characteristics of the threat, such as imminence/urgency or severity. As shown in the diagram of FIG. 11, the arrow 131 shows that the threat detection warning signal may be performed by sequentially activating each of the tactile feedback units 16 (individually or in groups) for a short duration or pulse in a rotational sequence around the array. The arrow 131 shows the tactile feedback units 16 being activated in a counter-clockwise sequence, but the sequence could also be clockwise, or a counter-clockwise sequence could signal a first type of threat while a clockwise sequence could signal a second type of threat.

Referring to FIG. 12, the method 130 comprises step 132 in which a threat detection warning event occurs in the virtual reality experience being executed on the virtual reality system 30. At step 134, the virtual reality system 30 sends a general threat detection warning control signal to the microcontroller 20 via the USB communication interface 28 or the wireless communication interface 32. At step 136, the microcontroller 20 processes the general threat detection warning control signal to determine the sequence for activating the tactile feedback units 16 corresponding to the control signal. At step 138, the microcontroller 20 activates the tactile feedback units 16 (e.g., in a sequence) to signal a general threat detection warning, as described above.

Figure 13:
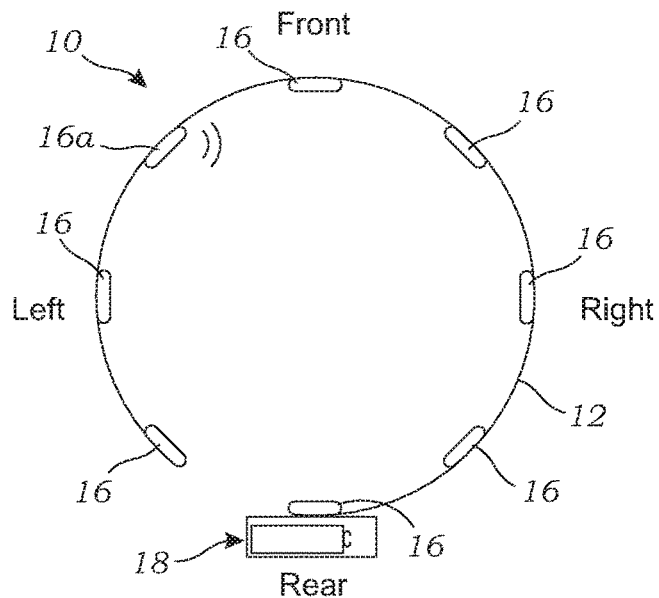
FIG. 13 is a schematic depicting a directional threat detection warning scenario being signaled by the tactile feedback system of FIG. 1.
Figure 14:
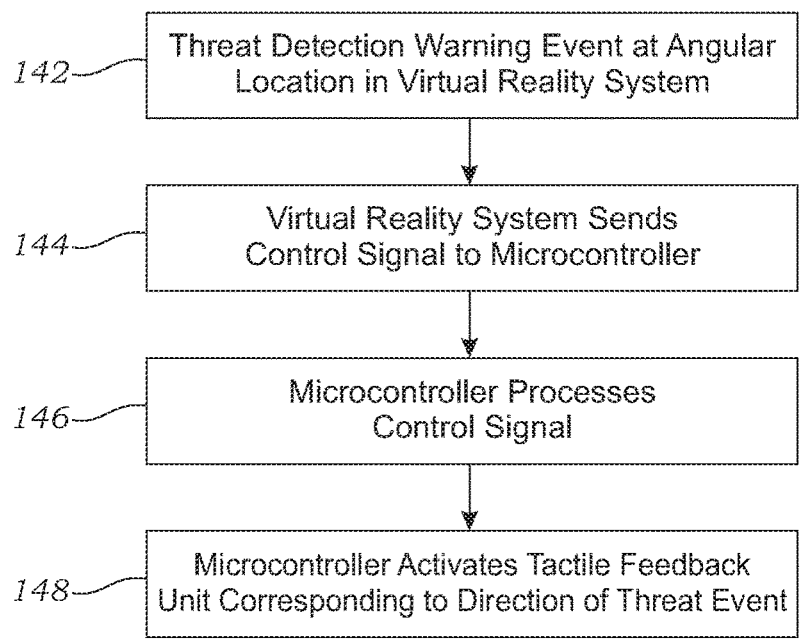
FIG. 14 is a flow chart illustrating a method of operation of the tactile feedback system of FIG. 1 for the directional threat detection warning scenario, according to another embodiment of the present invention.

Referring now to FIGS. 13 and 14, a diagram and flowchart depict the tactile feedback system 10 configured to perform a method 140 for signaling a directional threat detection warning. A directional threat detection warning indicates both that there is a threat (e.g., a potential danger) and the direction of the threat event relative to the user 11 occurring in the virtual reality experience. As shown in FIG. 13, the tactile feedback system 10 is configured to activate the tactile feedback unit 16a to indicate to the user 11 the approximate angular direction of the threat to the user 11 in the virtual reality experience. To indicate a threat, as opposed to damage for example, the microcontroller 20 may be configured to activate the tactile feedback unit 16a by oscillating or pulsing (i.e., quickly activating and de-activating) the tactile feedback unit 16a multiple times) the tactile feedback unit 16a. For instance, in the example depicted in FIG. 13, the threat is located in the front/left of the user 11, such that the tactile feedback system 10 activates the tactile feedback unit 16a located on the front/left of the tactile feedback system 10. A similar method to method 140 may also be utilized to provide a directional signal to a user for events, items or situations other than threats, such as for providing a directional indicator to signal an event, item or situation in a particular direction within the virtual reality experience.

As shown in the flow chart of FIG. 14, the method 140 comprises step 142 in which a threat detection warning event occurs at an angular location relative to the user 11 in the virtual reality experience being executed on the virtual reality system 30. At step 144, the virtual reality system 30 sends a directional threat detection warning control signal to the microcontroller 20 via the USB communication interface 28 or the wireless communication interface 32. The directional threat detection warning control signal indicates the angular direction of the threat event. At step 146, the microcontroller 20 processes the directional threat detection warning control signal to determine the tactile feedback unit 16 corresponding to the angular location of the threat event. At step 148, the microcontroller 20 activates the tactile feedback unit 16a corresponding to the direction of the threat event relative to the user 11 in the virtual reality experience by, e.g., oscillating or pulsing the tactile feedback unit 16a, as described above.

Figure 15:
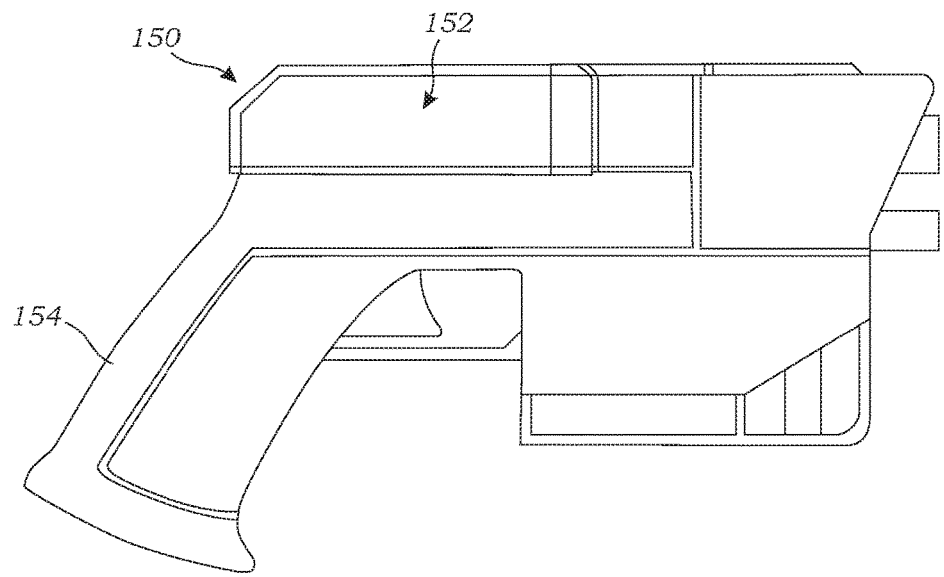
FIG. 15 is a side view of a haptic gun, according to another embodiment of the present invention.
Figure 16:
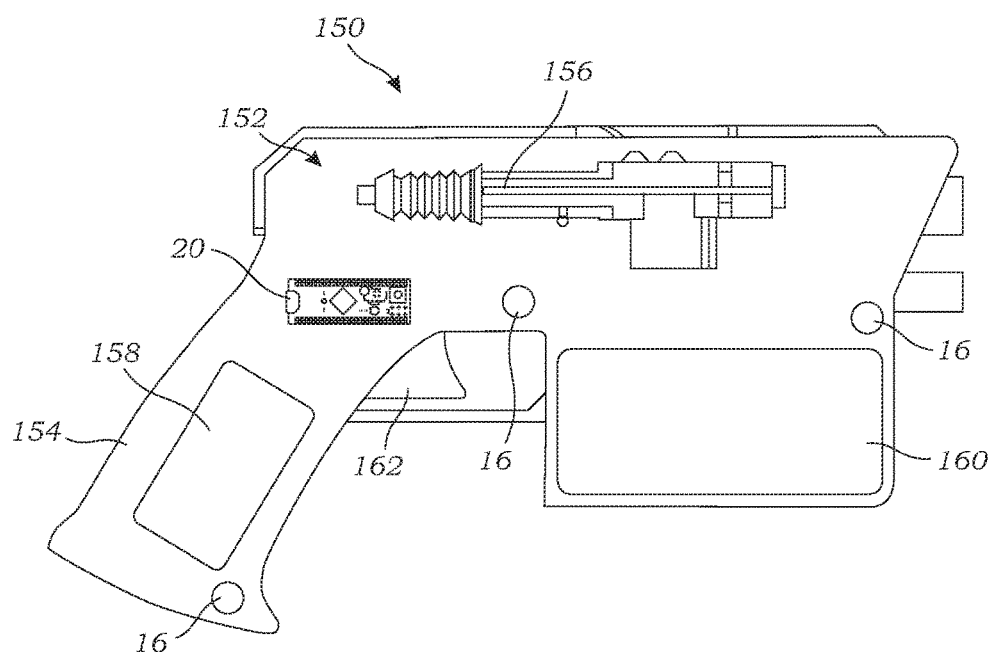
FIG. 16 is a side, cut-away view of the haptic gun of FIG. 15.

Referring now to FIGS. 15-18, another embodiment of the present invention is directed to a haptic, toy gun, game controller 150 for use with a virtual reality system 30. The virtual reality system 30 may be the same, or similar to the virtual reality system described above for the tactile feedback system 10. As shown in FIG. 15, the haptic gun 150 is shaped like a handgun and has a main body 152 having a handle 154. Although the exemplary embodiment shown in FIGS. 15-16 is in the shape of a handgun, the gun may be shaped and configured as any suitable type of gun, including without limitation, a handgun, rifle, shotgun, machine gun, laser gun, BB gun, paintball gun, pellet gun, light machine gun, replica of an actual gun, or any made-up gun. Thus, the body 152 is in the shape of the desired gun.

Turning to FIG. 16, a plurality of tactile feedback units 16 are coupled to the main body 152, such as being housed in the main body 152. The tactile feedback units 16 may be the same as, or similar to, to the tactile feedback units 16 described above with respect to the tactile feedback system 10. The tactile feedback units 16 are located spaced apart within the main body 152, such as a tactile feedback unit 16 located in the handle 154, a tactile feedback unit 16 located in the middle of the main body 152, and a tactile feedback unit 16 located near the front end of the main body 152 (e.g., proximate the end of the barrel of the gun 150). More or fewer tactile feedback units 16 may be utilized, depending on the desired effects to be produced by the tactile feedback units 16.

A linear actuator 156 is also coupled to the main body 152, in this case housed within the main body 152. The linear actuator 156 is configured to be activated to provide a linear force simulating a recoil from firing the haptic gun 150. The linear actuator 156 may also provide a linear force in the opposite direction when the linear actuator is reset which can simulate the gun 150 loading another round of ammunition.

A microcontroller 20 having a processor, a tracker device 158 and a power source 160 are also housed in the main body 152. The microcontroller 20 may be the same as, or similar to, to the microcontroller 20 described above with respect to the tactile feedback system 10. The haptic gun 150 has a gun communication interface 166 which may be integrated into the microcontroller 20, or may be a separate component operably coupled to the microcontroller 20. The gun communication interface 166 may be, for example, a wired communication interface such as USB, or a wireless communication interface such as Bluetooth or Wi-Fi, and is configured to provide electronic communication between the microcontroller 20 and system communication interface of the virtual reality system 30.

Each of the tactile feedback units 16 and the linear actuator 156 are operably coupled to the microcontroller 20 such that each of the tactile feedback units 16 and the linear actuator 156 may be activated independently of each other. A trigger 162 is also coupled to the main body 152. The trigger 162 is configured to be actuated by pulling the trigger with a finger of a user. The trigger 162 is also operably coupled to the microcontroller 20.

The tracker device 158 is configured to provide tracking data to the virtual reality system 30. The tracker device 158 has a tracker communication interface, such as a wireless communication interface or a USB communication interface, for communicating the tracking data to the system communication interface of the virtual reality system 30. The tracker device 158 may have accelerometer(s), and/or other sensors to detect the motion, location, and/or orientation of the haptic gun 150.

Turning to FIG. 17, a high-level schematic of the electronic system of the haptic gun 150 is shown. It is understood that the schematic of FIG. 17 does not include all of the components of the electronic system (e.g., transistors, diodes, resistors, etc.), but one or ordinary skill in the art is enabled to incorporate the high-level schematic into an operable electronic system. The electronic system includes an electronic circuit 164 operably interconnecting the microcontroller 20, the power source 160, the tracker device 158, the tactile feedback units 16 and the linear actuation 156. Referring to FIG. 18, a schematic is shown for an exemplary dual power relay 168 for powering the linear actuator 156. The dual power relay 168 includes two 5 volt power relays 170 which are operably coupled to the microcontroller 20 and to the linear actuator 156.

Figure 19:
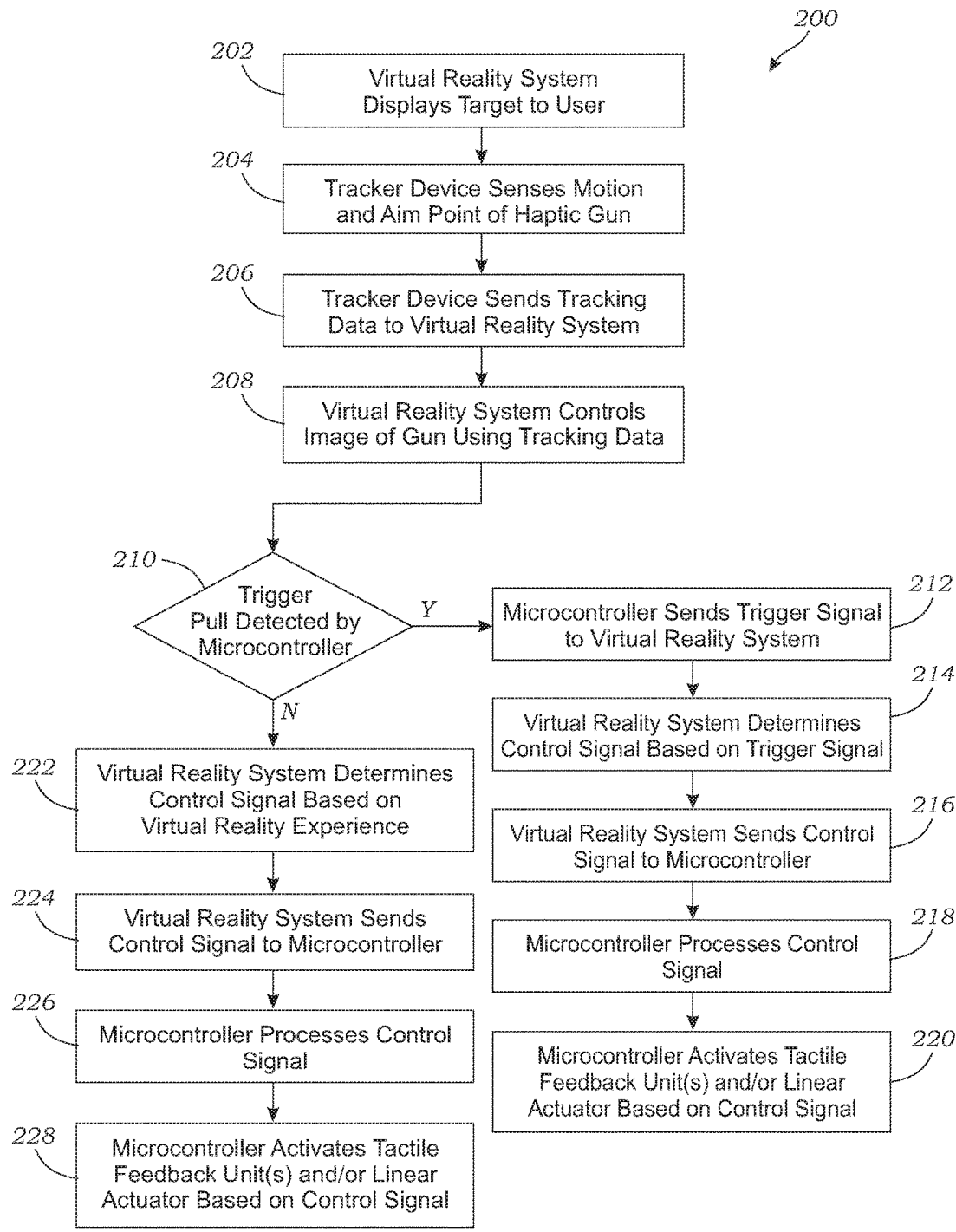
FIG. 19 is a is a flow chart illustrating a method of operation of the haptic gun of FIG. 15, according to another embodiment of the present invention.

Turning to FIG. 19, a method 200 for operating the haptic gun 150 while using the haptic gun 150 with a virtual reality system 30 is shown. The haptic gun 150 is linked to the virtual reality system 30 such that the microcontroller 20 and virtual reality system may electronically communicate via the gun communication interface 166 and the system communication interface. At step 202, the virtual reality system 30 displays a target in the virtual reality experience which is seen by the user. At step 204, the user moves and aims the haptic gun 150 to aim at the target, and the tracker device 158 senses the motion and aim point of the haptic gun 150. At step 206, the tracker device 158 sends tracking data to the virtual reality system 30 via the tracker communication interface and the system communication interface. At step 208, the virtual reality system 30 controls an image of a gun within the virtual reality experience corresponding to the haptic gun 150, and displays the image to the user based on the tracking data. At step 210, the microcontroller 20 detects whether that the trigger 162 has been actuated. If the user actuates the trigger 162, the microcontroller 20 detects that the trigger has been actuated, and at step 212, the microcontroller 20 sends a trigger signal to the virtual reality system 30. At step 214, the virtual reality system 30 processes the trigger signal and determines a control signal or signals to send to the microcontroller 20 for controlling the operation of the tactile feedback units 16 and/or the linear actuator 156. At step 216, the virtual reality system 30 sends the control signal(s) to the microcontroller 20. At step 218, the microcontroller 20 processes the control signal(s) to determine if and how to actuate the tactile feedback unit(s) 16 and/or the linear actuator 156. At step 220, the microcontroller activates the tactile feedback unit(s) 16 and/or the linear actuator 156 based on the control signal(s). If the trigger has not been actuated at step 210, then at step 222, the virtual reality system determines a control signal based on the virtual reality experience. For example, the corresponding gun in the virtual reality experience may be hit or damaged. At step 224, the virtual reality system 30 sends a control signal to the microcontroller 20. Then, at step 226, the microcontroller 20 processes the control signal to determine if and how to actuate the tactile feedback unit(s) 16 and/or the linear actuator 156. At step 228, the microcontroller activates the tactile feedback unit(s) 16 and/or the linear actuator 156 based on the control signal(s).

Figure 20:
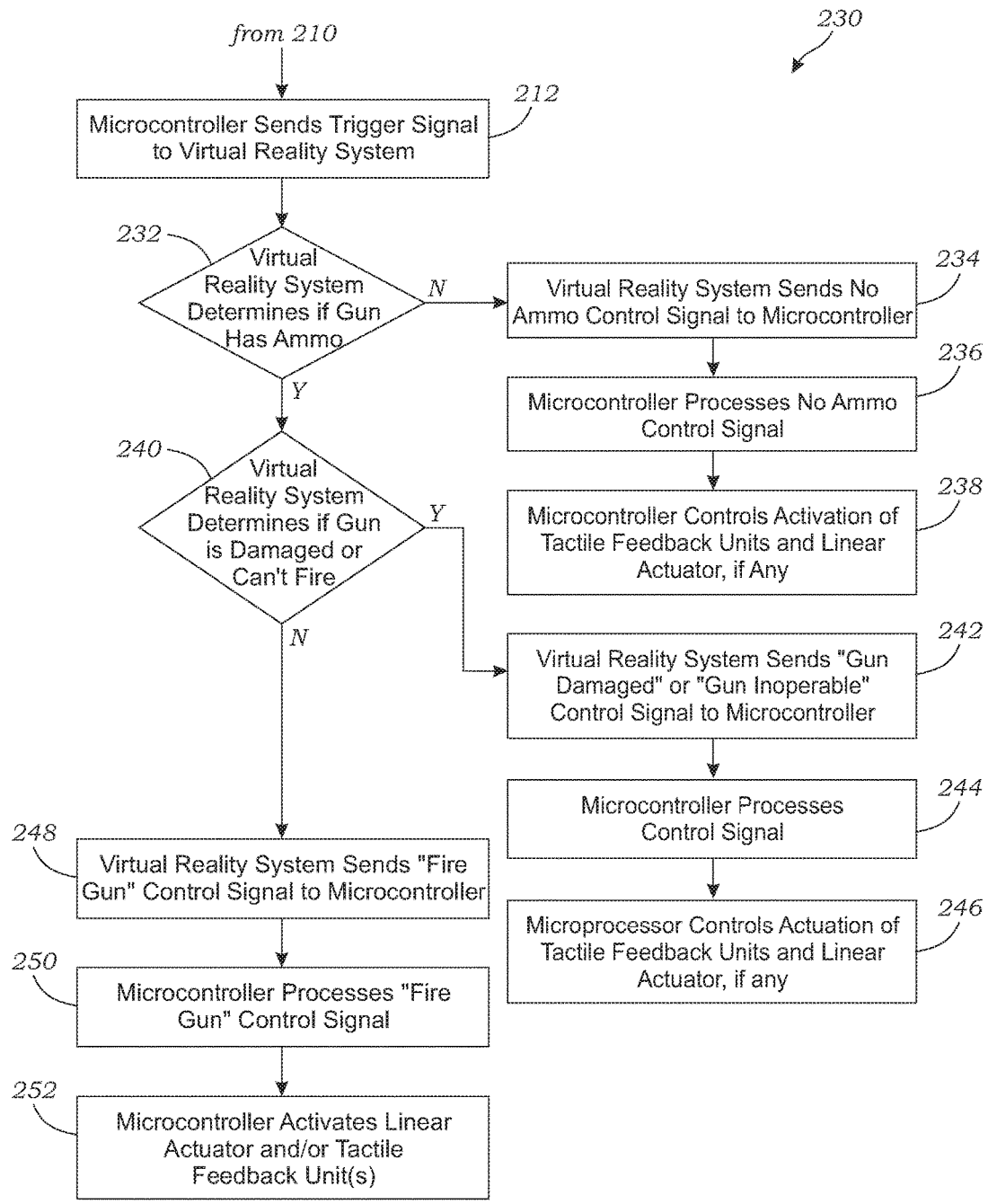
FIG. 20 is a flow chart illustrating a method of operation of the haptic gun of FIG. 15 for a trigger actuation scenario, according to another embodiment of the present invention.

Turning to the flow chart of FIG. 20, a method 230 for a particular use case for firing the haptic gun 150 is shown. The method 230 may be performed following step 212 and replaces the steps following 212 in the method 200 described above and shown in FIG. 19. At step 232, the virtual reality system 30 determines whether a virtual gun within the virtual reality experience corresponding to the haptic gun 150 has ammunition. If the virtual gun does not have ammunition, then at step 234, the virtual reality system 30 sends a "No Ammo" control signal to the microcontroller 20. At step 236, the microcontroller processes the "No Ammo" control signal to determine if and how to activate the tactile feedback units 16 and/or the linear actuator 156. If the microcontroller 20 is configured (i.e., programmed) to activate the tactile feedback units 16 and/or the linear actuator 156 in response to a "No Ammo" control signal, then at step 238, the microcontroller 20 activates the tactile feedback units 16 and/or the linear actuator 156. Typically, in a "No Ammo" scenario, the microcontroller 20 does not activate the linear actuator 156, but may activate one or more of the tactile feedback units 16 to simulate dry fire (e.g., to simulate a hammer or firing pin being actuated, but no round fired).

If the virtual reality system 30 determines at step 232 that the gun has ammunition to be fired, then at step 240, the virtual reality system 30 determines if the virtual gun is damaged or cannot fire for any other reason within the virtual reality experience. If the gun is damaged or cannot fire, at step 242, the virtual reality system sends a "gun damaged" or "gun inoperable" control signal to the microcontroller 20. At step 244, the microcontroller 20 processes the control signal to determine if and how to activate the tactile feedback units 16 and/or the linear actuator 156. If the microcontroller 20 is configured (i.e., programmed) to activate the tactile feedback units 16 and/or the linear actuator 156 in response to a "gun damaged" or "gun inoperable" control signal, then at step 246, the microcontroller 20 activates the tactile feedback units 16 and/or the linear actuator 156. Typically, in a "gun damaged" or "gun inoperable" scenario, the microcontroller 20 does not activate the linear actuator 156, but may activate one or more of the tactile feedback units 16 to simulate dry fire (e.g., to simulate a failed attempt to fire the gun).

If the virtual reality system 30 determines at step 240 that the gun is not damaged or otherwise inoperable, then at step 248, the virtual reality system 30 sends a "fire gun" control signal to the microcontroller 20. At step 250, the microcontroller 20 processes the "fire gun" control signal to determine if and how to activate the tactile feedback units 16 and/or the linear actuator 156, or to simply execute a pre-programmed "firing sequence." Typically, in a "fire gun" scenario, the microcontroller 20 is configured (i.e., programmed) to activate the linear actuator 156 in response to a "fire gun" control signal. The microcontroller 20 may also activate one or more of the tactile feedback units 16 to indicate certain scenarios, such as firing a very powerful gun, or other scenarios. At step 252, the microcontroller 20 activates the linear actuator 156 and/or tactile feedback units 16, based on the "fire gun" control signal.

In another aspect, the virtual reality system 30 may send a control signal to the microcontroller 20 indicating how many rounds of ammunition the gun has to fire, and the microcontroller 20 is configured to perform the firing sequence each time the trigger is actuated (or held depressed in the case of a simulated automatic gun) for the number of rounds of ammunition remaining. When the number of rounds has been exhausted, the microcontroller 20 receives another control signal from the virtual reality system in order to perform any further firing sequences. This aspect can account for communication delays between the haptic gun 150 and the virtual reality system 20, such as delays caused by EMI or other communication interference.

Figure 21:
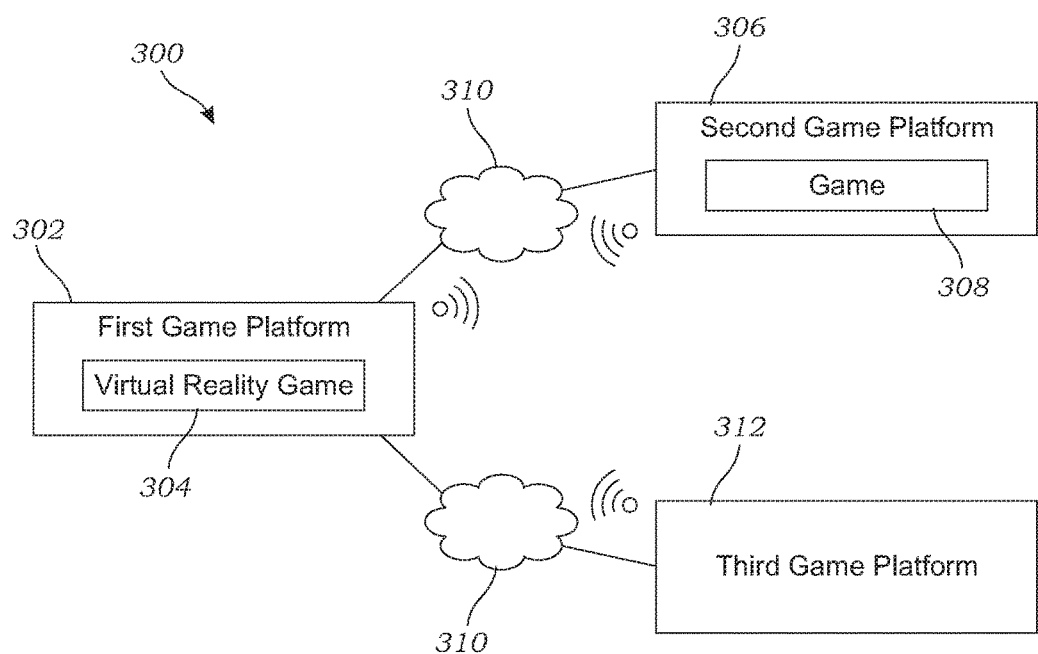
FIG. 21 is a schematic view of a virtual reality system for providing a single game instance for multiple clients each utilizing a different game platform.

Turning to FIG. 21, another embodiment of the present invention is directed to a video game system 300 for providing a single game play instance wherein multiple clients can play the same game instance with each client utilizing a different game platform. The video game system 300 includes a first game platform 302 which is a virtual reality system 30, as described herein. The first game platform 302 executes a virtual reality game 304 on the virtual reality system 30. The virtual reality system 30 may be a virtual reality headset, as described herein, or other virtual reality system. The video game system 300 includes a second game platform 306 executing a game 308 having a similar representation of the virtual reality game but modified for the second game platform 306. The first game platform 302 and second game platform 306 each have communication interfaces configured to allow them to communicate with each other to provide a single instance game space for the first game platform 302 and second game platform 306. For example, the communication interfaces may be wired interfaces, or wireless interfaces, as described herein. Furthermore, the first game platform 302 and second game platform 306 may communicate with each other over the Internet 310 using their respective communication interfaces to connect to the Internet 310.

In another aspect, the video game system 300 may also include a third game platform 312 which is in communication with the first game platform 302. The first game platform 302 and third game platform 312 are configured to allow the third game platform 312 to display a representation of the virtual reality game 304 on a video display as it is being played on the first game platform 302. For example, the third game platform 312 may be a tablet computer, a smart TV, a personal computer, a smart phone, or other computing device not having virtual reality capability, such that a spectator can watch the game play while a user is using the virtual reality game 304. For instance, if the user is using a virtual reality headset, only the user can see the game play, so it is useful to allow others to view the game play on the third game platform 312. It is understood, that additional game platforms, same, similar, or different to the first game platform 202 or the second game platform 306, can be connected and added to the video game system 300 to allow additional clients to play the same single game instance. Similarly, additional game platforms, same, similar, or different to the third game platform 312, may be connected to the video game system 300 to allow additional observers to view the game play. Also, additional game platforms 302 may be connected to the video game system 300. In the case of additional game platforms 302, specific game platforms 312 can be slaved to various headsets, and/or games platforms 312 can be allowed to switch from one game platform 302 to another game platform 302 to view the game from different views from their perspective. In addition when a client's game ends, e.g., the client's character is dead or the client's active participation in the game otherwise terminates, the system 300 allows such client to continue to view the gamer. For instance, the system 300 may allow such client to view the game from the perspective of one of the other clients that is still active in the game. Any of the game platforms 302 and 306 may also be configured to register a client's death and/or termination of such client's active participation in the game, for example, as a result of a "game conclusion" event. The game platform may send a "end game" signal to all of the other game platforms involved in the single game instance which indicates to that the respective client is dead or has terminated active participation in the game.

In some embodiments, observers viewing a game through a game platform connected to the video game system 300 may participate in or interact with game play through certain predefined audience actions, such as cheering or booing, wagering on a game play result or event, conversing or chatting with one or more players or observers, deploying game play objects into game play, or any other game play-related action. Additional non-limiting examples of audience actions may include causing an attack/defense in a combat-themed game (e.g., throwing a grenade, firing a shot, launching a missile, casting a spell into the game); helping or obstructing a player (e.g., giving/taking health, mana, ammunition, virtual currency, weapons, power-ups, etc.); giving hints to players of the game; wagering with other observers/players on the outcome of the game; cheering on a particular player.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A multi-directional, tactile feedback system for use with a virtual reality system being used to present a virtual reality experience, comprising:
 a support structure;
 a microcontroller coupled to the support structure;
 a plurality of tactile feedback units mounted to the support structure in spaced apart relation, each of the tactile feedback units operably coupled to the microcontroller and configured to produce a tactile feedback to a user;
 the microcontroller configured to operate the tactile feedback units in response to control signals received from the virtual reality system by selectively activating one or more selected tactile feedback units in a sequence to indicate a direction of an event occurring in the virtual reality experience;
 wherein the microcontroller is further configured to activate a first tactile feedback unit at a first intensity related to a direction of damage in the virtual reality experience and activate tactile feedback units adjacent the first tactile feedback unit at a second intensity different than the first intensity, based on the control signals.

2. The system of claim 1, wherein the first intensity is higher than the second intensity.

3. The system of claim 1, wherein the microcontroller is further configured to adjust the first intensity to correspond to an intensity of damage in the virtual reality experience.

4. The system of claim 1, wherein the microcontroller is configured to activate a number of adjacent tactile feedback units based on an intensity of damage in the virtual reality experience such that an increasing intensity of damage corresponds to an increasing number of adjacent tactile feedback units being activated.

5. A method of providing tactile feedback with a virtual reality system being used to present a virtual reality experience, comprising:

provproviding a tactile feedback device comprising a support structure, a plurality of tactile feedback units mounted to the support structure in spaced apart relation, each of the tactile feedback units configured to produce a haptic feedback to a user, a communication interface for receiving control signals from the virtual reality system, and a microcontroller configured to control operation of the tactile feedback units based on the control signals;

the communication interface receiving a directional control signal from the virtual reality system via the communication interface, the directional control signal having directional data related to a direction of an event occurring in a virtual reality experience being presented on the virtual reality system;

the microcontroller selectively operating one or more of the tactile feedback units to indicate the directional aspect in response to the directional control signal; and the microcontroller activating a first tactile feedback unit at a first intensity related to a direction of damage in the virtual reality experience and activating tactile feedback units adjacent the first tactile feedback unit at a second intensity different than the first intensity, based on the control signals.

6. The method of claim 5, further comprising:

the communication interface receiving a threat detection warning control signal from the virtual reality system corresponding to a threat detection warning event in the virtual reality experience; and the microcontroller operating the tactile feedback units to provide a threat detection warning signal in response to the threat detection warning control signal.

7. The method of claim 6, wherein operating the tactile feedback units to provide the threat detection warning signal comprises sequentially activating each of the tactile feedback units for a short duration in a rotational sequence.

8. The method of claim 5, further comprising:

the microcontroller adjusting an intensity of the activation of one or more of the tactile feedback units based on the control signals to correspond to an intensity of damage in the virtual reality experience.

\* \* \* \* \*